(12) United States Patent
Filippi et al.

(10) Patent No.: US 6,982,066 B2
(45) Date of Patent: *Jan. 3, 2006

(54) REACTOR FOR EXOTHERMIC OR ENDOTHERMIC HETEROGENEOUS REACTIONS

(75) Inventors: Ermanno Filippi, Castagnola (CH); Enrico Rizzi, Grandate (CH); Mirco Tarozzo, Ligornetto (CH)

(73) Assignee: Methanol Casale S.A., (CH)

( * ) Notice: Subject to any disclaimer, the term of this patent is extended or adjusted under 35 U.S.C. 154(b) by 54 days.

This patent is subject to a terminal disclaimer.

(21) Appl. No.: 10/275,772

(22) PCT Filed: May 10, 2001

(86) PCT No.: PCT/EP01/04902

§ 371 (c)(1),
(2), (4) Date: May 13, 2003

(87) PCT Pub. No.: WO01/85331

PCT Pub. Date: Nov. 15, 2001

(65) Prior Publication Data

US 2003/0175184 A1    Sep. 18, 2003

(30) Foreign Application Priority Data

May 11, 2000    (EP) .................................. 00109968

(51) Int. Cl.
F28D 7/20    (2006.01)

(52) U.S. Cl. ...................... 422/198; 422/199; 422/200; 422/211

(58) Field of Classification Search ................ 422/198, 422/199, 200, 190, 211
See application file for complete search history.

(56) References Cited

U.S. PATENT DOCUMENTS

| | | | |
|---|---|---|---|
| 2,898,383 A | 8/1959 | Eisenlohr et al. | |
| 3,666,423 A | 5/1972 | Muenger | |
| 3,784,361 A | 1/1974 | Kubec et al. | |
| 3,796,547 A | 3/1974 | Muenger | |
| 3,958,629 A | 5/1976 | Andersson | |
| 3,982,901 A | 9/1976 | Steever et al. | |
| 4,594,227 A | 6/1986 | Ohsaki et al. | |
| 4,732,918 A | 3/1988 | Lohmueller et al. | |
| 4,820,495 A | 4/1989 | Vu et al. | |
| 5,035,867 A | 7/1991 | Dang Vu et al. | |
| 5,405,586 A * | 4/1995 | Koves | 422/218 |
| 5,564,370 A | 10/1996 | Giraud et al. | |
| 5,986,146 A * | 11/1999 | Sioli | 568/472 |

(Continued)

FOREIGN PATENT DOCUMENTS

DE    914131    6/1954

(Continued)

OTHER PUBLICATIONS

Astanovsky, D. et al, Revolutionary Reactor, Nitrogen & Methanol, No. 232, Mar.-Apr. 1998, pp. 33-39.

Primary Examiner—N. Bhat
(74) Attorney, Agent, or Firm—Akerman Senterfitt

(57) ABSTRACT

A reactor (1) for carrying out exothermic or endothermic heterogeneous reactions comprising an outer shell (2) of substantially cylindrical shape and at least a heat exchanger (9) embedded in a catalytic layer (10) supported in said shell (2), is characterized in that the heat exchanger (9) is a plate (14) heat exchanger.

10 Claims, 6 Drawing Sheets

U.S. PATENT DOCUMENTS

| | | | |
|---|---|---|---|
| 2002/0018740 A1 * | 2/2002 | Filippi et al. | 422/198 |
| 2002/0085969 A1 * | 7/2002 | Filippi et al. | 422/200 |
| 2002/0117294 A1 * | 8/2002 | Filippi et al. | 165/170 |
| 2003/0175184 A1 * | 9/2003 | Filippi et al. | 422/198 |
| 2004/0071606 A1 * | 4/2004 | Filippi et al. | 422/126 |
| 2004/0204507 A1 * | 10/2004 | Filippi et al. | 518/726 |

FOREIGN PATENT DOCUMENTS

| | | |
|---|---|---|
| DE | 197 23 977 A1 | 12/1998 |
| EP | 0484534 A1 | 5/1992 |
| EP | 0 995 491 A1 | 4/2000 |
| GB | 626866 A | 7/1949 |
| JP | 61118132 A | 6/1986 |

* cited by examiner

__US 6,982,066 B2__

REACTOR FOR EXOTHERMIC OR ENDOTHERMIC HETEROGENEOUS REACTIONS

The present invention relates to an isothermal reactor for carrying out exothermic or endothermic heterogeneous reactions, of the type comprising:

- an outer shell of substantially cylindrical shape;
- at least a heat exchanger embedded in a catalytic layer supported into such shell.

In the following description and attached claims, the expression "isothermal reactor" is meant to indicate a reactor for chemical reactions wherein the temperature inside the one or more catalytic layers where the reaction takes place, is controlled by essentially removing or supplying heat. Such reaction may be of both of exothermic or endothermic type. On the contrary, the expression "adiabatic reactor" is meant to indicate a reactor for chemical reactions wherein inside the one or more catalytic layers where the reaction takes place, there is no heat exchange with the outer environment.

As known, in the field of exothermic or endothermic heterogeneous synthesis, the need is more and more felt of having high capacity isothermal reactors available, which on one side are of simple construction, reliable and require low investment and maintenance costs, and on the other side are able to operate with a high conversion yield, low pressure drops, low energy consumption and high heat exchange efficiency between the reactants and the heat exchange fluid.

STATE OF THE ART

In order to fulfil such requirement, isothermal reactors have been proposed with a catalytic layer crossed by the reactants perpendicularly to the reactor axis and comprising inside it a heat exchanger consisting of a great number of ducts for removing or supplying the heat. In the following description, such layer will be designated as radial catalytic layer.

An example of such reactors is described in DE-A-3 318 098.

In such patent document, the heat exchanger consists of ducts that run helicoidally around a collector extending along the reactor axis for collecting the reaction gaseous products.

In particular, a heat exchanger is foreseen, consisting of a bundle of helicoidal ducts supported between opposed tube plates arranged at the ends of the shell.

It shall be noted that heat exchangers of the above design are also known in reactors with catalytic layer intended for being axially crossed by the reactant gases.

Reference shall be made, for instance, to U.S. Pat. No. 4,339,413 and U.S. Pat. No. 4,636,365.

Although advantageous under some aspects, the reactor provided with heat exchanger described in DE-A-3 318 098 has a series of drawbacks which are pointed out hereinbelow.

First of all the fact that, as it crosses the catalytic layer, the flow of reactant gases and reaction products which flows transversely with respect to the arrangement of the helicoidal ducts, comes into contact with different ducts at different temperatures, with a varying heat exchange efficiency from tube to tube.

In other words, in case of an exothermic reaction, the gaseous reactants gradually increase their temperature while crossing the catalytic layer in radial direction. For this reason, the outer ducts in the bundle of helicoidal ducts are impinged by a relatively cold flow, whereas the inner ones are impinged by an ever warmer gas from which they take on an ever increasing amount of heat.

As a result, each helicoidal tube, according to its location in the catalytic layer, receives a different amount of heat and hence has to support a different thermal load.

Should, for example, the heat exchange fluid consist of water that is transformed into steam, none two ducts produce the same amount of steam in the arrangement of heicoidal tube bundle heat exchanger suggested in DE-A-3 318 098.

Further on, the substantial detected reduction of heat exchange efficiency is also due to the fact that the ducts of the aforesaid arrangement in contact with the gaseous reactants at low temperature are subjected to a low thermal load, what implies a low degree of vaporisation for the water with ensuing low outflow speed and hence high water flow rates, in terms of mass.

On the contrary, the helicoidal tubes in contact with the high temperature gaseous reactants are subjected to a high thermal load, what implies a high degree of vaporisation for the water with ensuing high outflow speed and hence low water flow rates, in terms of mass.

A further disadvantage of the reactor according to the prior art is its high structural and manufacturing complexity resulting from the helicoidal design of the tube bundle that requires for sure high investment and maintenance costs. It shall be noted that in some cases such structural complexity may even make it impossible to carry out its maintenance.

Just because of these disadvantages, the isothermal reactors for carrying out exothermic or endothermic heterogeneous syntheses of the above-mentioned type have found to date little practical application, notwithstanding the increasingly felt need in the field of high capacity reactors.

Such drawbacks do even get worse in case the isothermal reactor in use is not of the above mentioned helicoidal tube bundle type but of the vertical tube bundle type.

SUMMARY OF THE INVENTION

The technical problem underlying the present invention is that of providing an isothermal reactor for carrying out exothermic or endothermic heterogeneous reactions, which is capable of fulfilling the above described need and at the same time overcomes all the drawbacks mentioned with reference to the prior art.

According to the invention, the problem is solved by a reactor of the above-indicated type, characterised in that:

said heat exchanger is a plate heat exchanger.

As used herein, the expression "plate heat exchanger" refers to a heat exchanger having plates comprising dedicated ducts inside which the heat exchange fluid flows. In particular, such plates comprise—preferably corrugated—walls, which are mutually parallel and juxtaposed to each other, between which there are provided the aforesaid ducts for the circulation of the heat exchange fluid.

The plate heat exchanger is embedded in a catalytic layer crossed by the gaseous reactants that, coming into contact with the catalyst, react and produce heat in case of an exothermic reaction. The heat produced is released from the reacted gases, whilst they impinge the aforesaid plates, to a coolant that flows in such ducts.

Thanks to the present invention it is advantageously possible to obtain—in an easy and effective way—an isothermal reactor at high heat exchange degree that allows an optimum control of the temperature, to all advantage of the conversion yield and of the energy consumption.

In fact, according to the present invention, each single duct defined between said plates can respectively run along two distinct directions.

A first direction parallel to the reactor axis and, accordingly, parallel to the generatrix of the shell if the reactants flow is directed along such axis (axial flow) or alternatively a second direction perpendicular to the reactor axis if the reactants flow is so directed (radial flow).

In this way, the ducts are advantageously always substantially parallel to the gaseous flow, which comprises the reactants and the reaction products.

This means that each single duct of the plate exchanger according to the present invention is in contact with the same portion of reactants thereby advantageously following all the variations of heat developed or absorbed by the reaction; therefore it is possible to obtain a predetermined temperature profile for the reaction in run.

Further on, whenever a plurality of ducts according to the present invention is arranged inside the one or more catalytic layers, those ducts all advantageously are subjected to the same thermal load. In case for example of an exothermic reaction with hot or boiling water as coolant, all the ducts produce the same amount of steam (uniform distribution of water and steam inside the ducts).

The higher heat exchange efficiency inside the reactor according to the invention allows recovering or supplying heat with smaller temperature differences between the reactant fluid and the heating or cooling fluid. This advantage implies a smaller gradient of temperature inside the catalytic layer between two adjacent plates, hence achieving a greater uniformity of temperature inside the catalytic layer and therefore an increase of the conversion yield with respect to the reactors according to the prior art. Or, the conversion yield being the same, the increase of the heat exchange efficiency allows decreasing the required volume of catalyst with the ensuing savings in terms of space and investment costs.

A further advantage arising with the present invention consists in that when a plurality of ducts is arranged inside a catalytic layer, such ducts may all be fed from a same source of supply because—all of them undergoing the same thermal load—there are no problems of control of the supply and removal of the cooling/heating fluid.

Further on, thanks to the structural simplicity of the heat exchangers it is possible to carry out their maintenance in a particularly easy and cost-effective way.

BRIEF DESCRIPTION OF THE DRAWINGS

The present invention will be further described with reference to the attached drawings provided as an indicative and not limiting example, in which.

DETAILED DESCRIPTION OF A PREFERRED EMBODIMENT

By making reference to the aforementioned drawings, the apparatus according to the present invention is described as follows.

Figure 1:
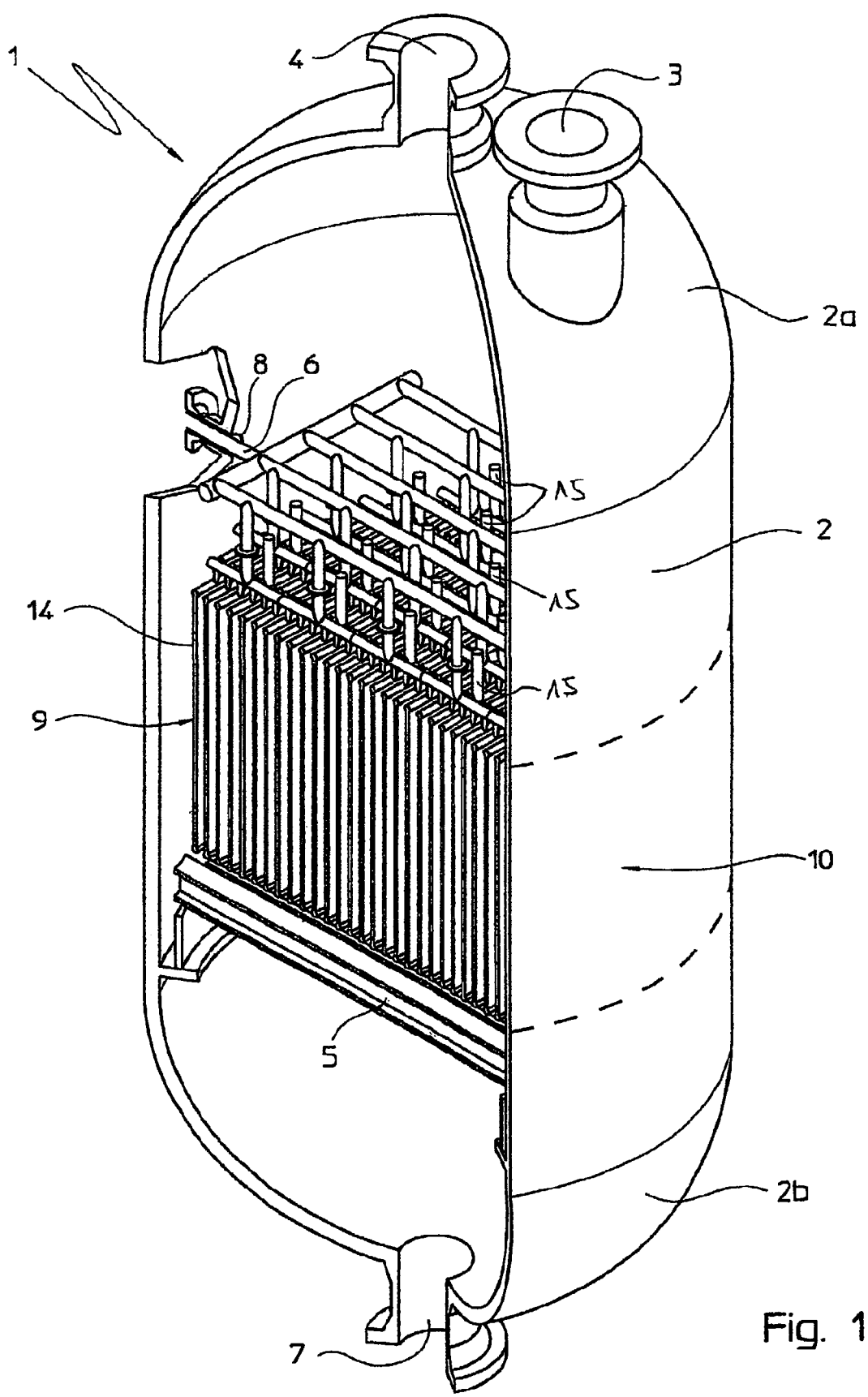
FIG. 1 shows in partial perspective view a reactor obtained according to the present invention.

With reference to FIG. 1 an isothermal reactor 1 with an outer shell 2 is shown, which is for carrying out exothermic or endothermic heterogeneous reactions.

Such shell 2 has a cylindrical structure closed at its ends by respective bottoms, an upper bottom 2a and a lower bottom 2b, in which the aperture 3 and 4 and the aperture 7 are provided, respectively.

The circular aperture 4 for the inlet of the gaseous products to be made react is arranged onto the top of the upper bottom 2a of the shell 2. Such aperture 4 directly faces the inside of the shell.

The aperture 3 is arranged on the upper bottom 2a of the shell 2 beside the aperture 4 whereby it faces the inside of the shell, too.

At the end of the bottom 2b of the shell 2 the aperture 7 is provided, which directly faces the inside of the shell 2.

Such apertures are formed during the construction: the aperture 3, so called manhole, in order to allow the periodical inspection of the reactor internal, and the apertures 4 and 7 for the inlet and outlet of the gas, respectively.

Inside the shell 2, a plurality of heat exchangers 9 is supported by means of one or more support beams 5 provided inside the shell 2.

Because of the high pressures and mechanical stresses to which the shell 2 is subjected, the same is formed in a highly resistant structure with a limited and strictly necessary number of apertures to the outside environment.

The feed of the heat exchangers 9 is guaranteed by the duct 6 introduced into the shell 2 through the aperture 8 formed in the upper portion of the side wall of such shell; such duct 6 is in fluid communication with the exchangers 9.

The heat exchange fluid introduced through the duct 6 flows inside the plates 14 described hereinbelow, which are included in each exchanger 9.

Such exchangers 9 are embedded in a catalytic layer 10 schematically shown in FIG. 1 by dotted lines.

Such catalytic layer 10 is bounded sideways by the internal surface of the shell 2 and in its lower part by a not shown layer of inert granulate material, that fills the lower bottom 2b and bears the catalytic layer 10.

Should the reaction be for instance of exothermic type, then with such arrangement for the heat exchangers the heat produced by the reaction taking place inside the catalytic layer 10 as a consequence of the gaseous reactants crossing it, is removed effectively as will be disclosed in the following.

Figure 2:
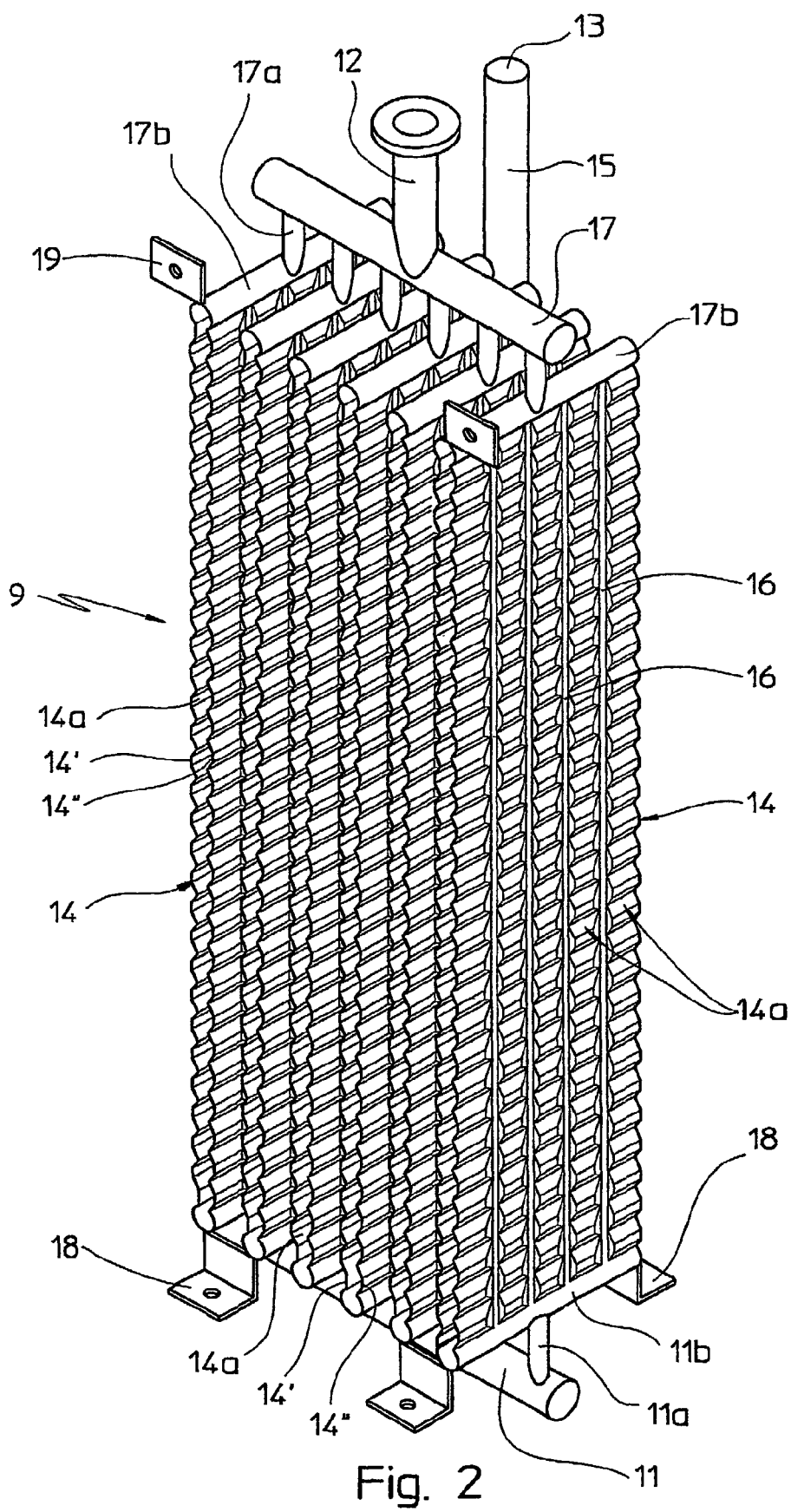
FIG. 2 shows a perspective and enlarged view of a particular of the reactor of FIG. 1.

With reference to FIG. 2, a plate 14 heat exchanger 9 is shown in detail, used inside a reactor crossed by a flow of reactants which is substantially parallel to the reactor axis (axial flow).

Plates 14 comprise walls 14' and 14", which are mutually juxtaposed and parallel to each other, respectively, and enclose inside them a plurality of ducts 14a, in which the heat exchange fluid flows parallel to the reactor axis.

In the example of FIG. 2, the ducts 14a are separated the one from the other sideways by welding lines 16 formed onto the walls 14', 14" of the plates 14. Just to make the figure more comprehensible, the side end of the plates 14 is shown open so to let the inside of a respective duct 14a be visible. It is clear that also at such side end of the plates 14 there are provided fixing means such as the welding lines 16.

Such ducts 14a enclosed in the plates 14 are in fluid communication with the duct 12 arranged at the top of the heat exchange 9. Said duct 12 ends up perpendicularly into the duct 17 from which ducts 17a are derived that are singularly connected to the ducts 14a through the distributor duct 17b.

In fluid communication with the ducts 14a, through the ducts 11a and 11b, a collector 11 is arranged at the basis of the plates 14 and of the related ducts 14a.

In fluid communication with the collector 11 and perpendicularly to it, a duct 15 extends which ends up into the aperture 13. In the example here described, the aperture 13 is in fluid communication with the inside space of the shell 2 above the catalytic layer 10.

Anchoring means may be provided at one or both the ends of the exchanger 9. Such means comprises for example brackets 18 and 19, which allow a removable fixing of the heat exchanger 9 onto the supporting beams 5 and to the adjacent exchangers 9, in order to advantageously ensure stability during the process operation and at the same time an easy dismantling during the maintenance activities.

Figure 3:
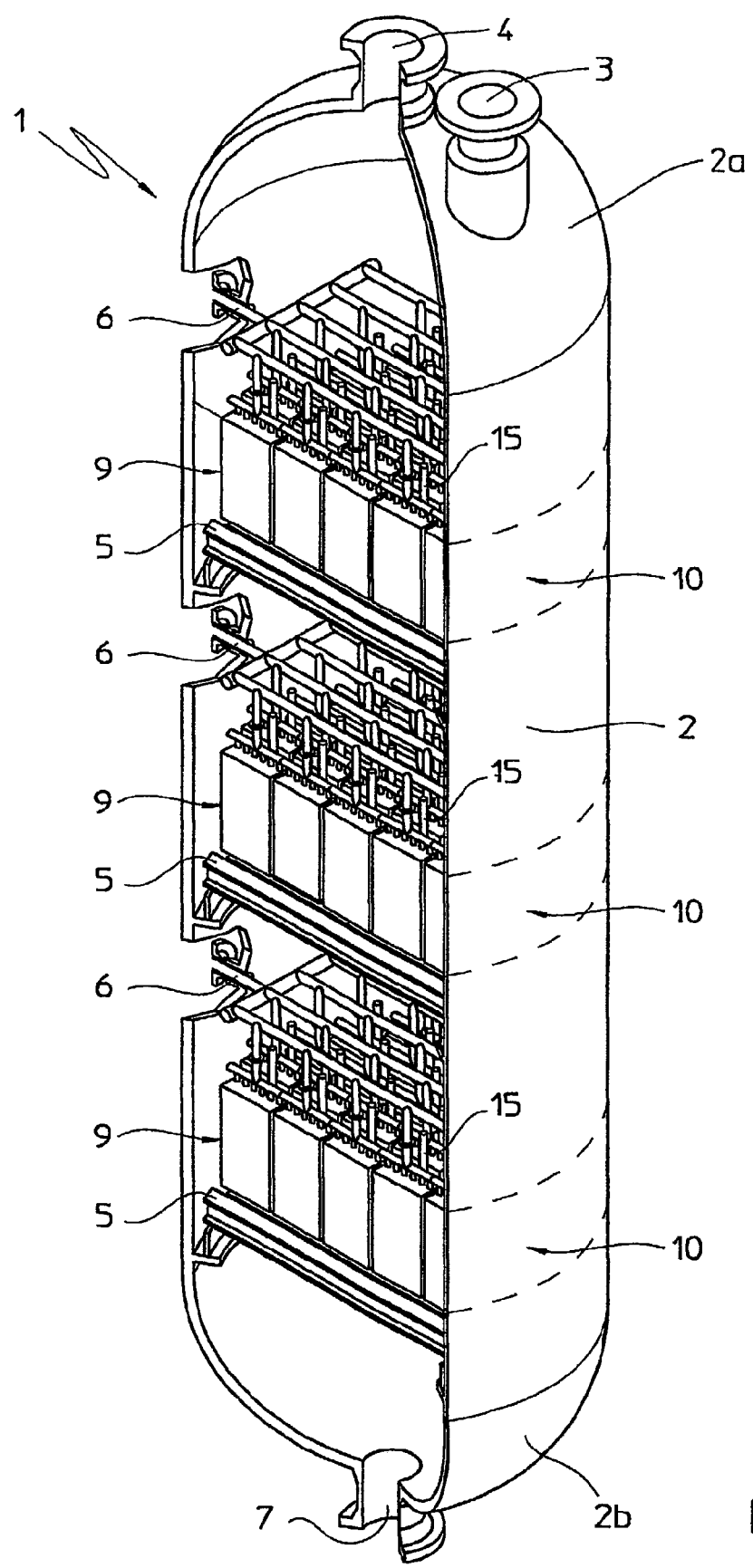
FIG. 3 shows in partial perspective view an alternative embodiment of the reactor of FIG. 1.

With reference to FIG. 3, an alternative embodiment for the reactor of FIG. 1 is shown, wherein inside the shell 2 a plurality of overlaid catalytic layers is arranged in series to each other. At of each catalytic layer 10 a plurality of plate exchangers 9 as above described is advantageously provided; such exchangers are supported by respective beams 5.

Each catalytic layer 10 is in turn supported by suitable supporting means not shown in FIG. 3, for example, by respective layers of inert granulate material or by respective gas-permeable bottoms.

According to a further embodiment of the reactor according to FIG. 3, not shown, inside the shell 2 a single catalytic layer is provided in which the exchangers 9 supported by the beams 5 are embedded.

In the lower bottom 2b of the shell 2 there is thus provided the layer of inert granulate material, for the support of the catalyst.

Both in the example of FIG. 1 and in the example of FIG. 3, the ducts 15 in fluid communication with the base of the ducts 14a can alternatively be connected to suitable collectors—not shown—for the collection and outflow from the reactor of the heat exchange fluid.

Figure 4:
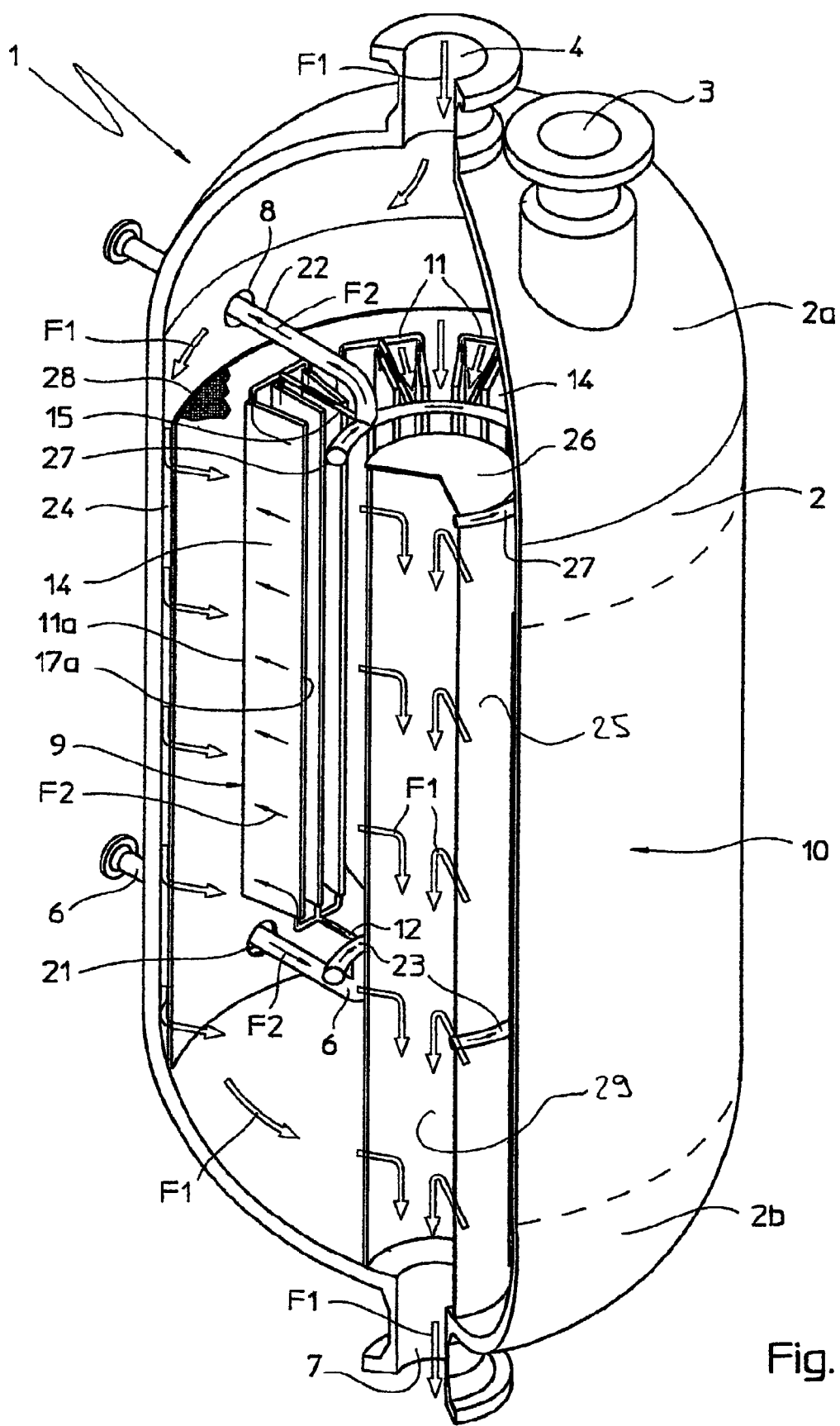
FIG. 4 shows in partial perspective view a reactor according to a further embodiment of the present invention.

With reference to FIG. 4, a further embodiment of the invention is shown in which the ducts 14a of the exchangers 9 are provided perpendicularly to the axis of reactor 1 and accordingly to the walls of the shell 2. In this case, the reactor 1 is crossed by a reactants flow substantially perpendicular to the reactor axis (radial flow) and the exchangers 9 are arranged radially.

In such figure, the features of the reactor 1 equivalent in term of structure and operation to those shown in the previous figures, will be referred to with the same reference numbers and will not be described anymore.

The plates 14 are mutually juxtaposed and parallel to each other, respectively, and include a plurality of ducts 14a inside them, in which a heat exchange fluid flows perpendicularly to the axis of reactor 1.

The ducts 14a are in fluid communication with the duct 6 for the supply of the heat exchange fluid, through the duct 12 and the annular duct 23. The duct 6 ends up inside the shell 2 through the aperture 21 obtained in a lower part of the same.

Further on, the ducts 14a are in fluid communication with the outlet duct 22 of the heat exchange fluid through the duct 15 and the annular duct 27. The duct 22 comes out of the shell 2 through the aperture 8, obtained in the upper portion thereof.

Figure 5:
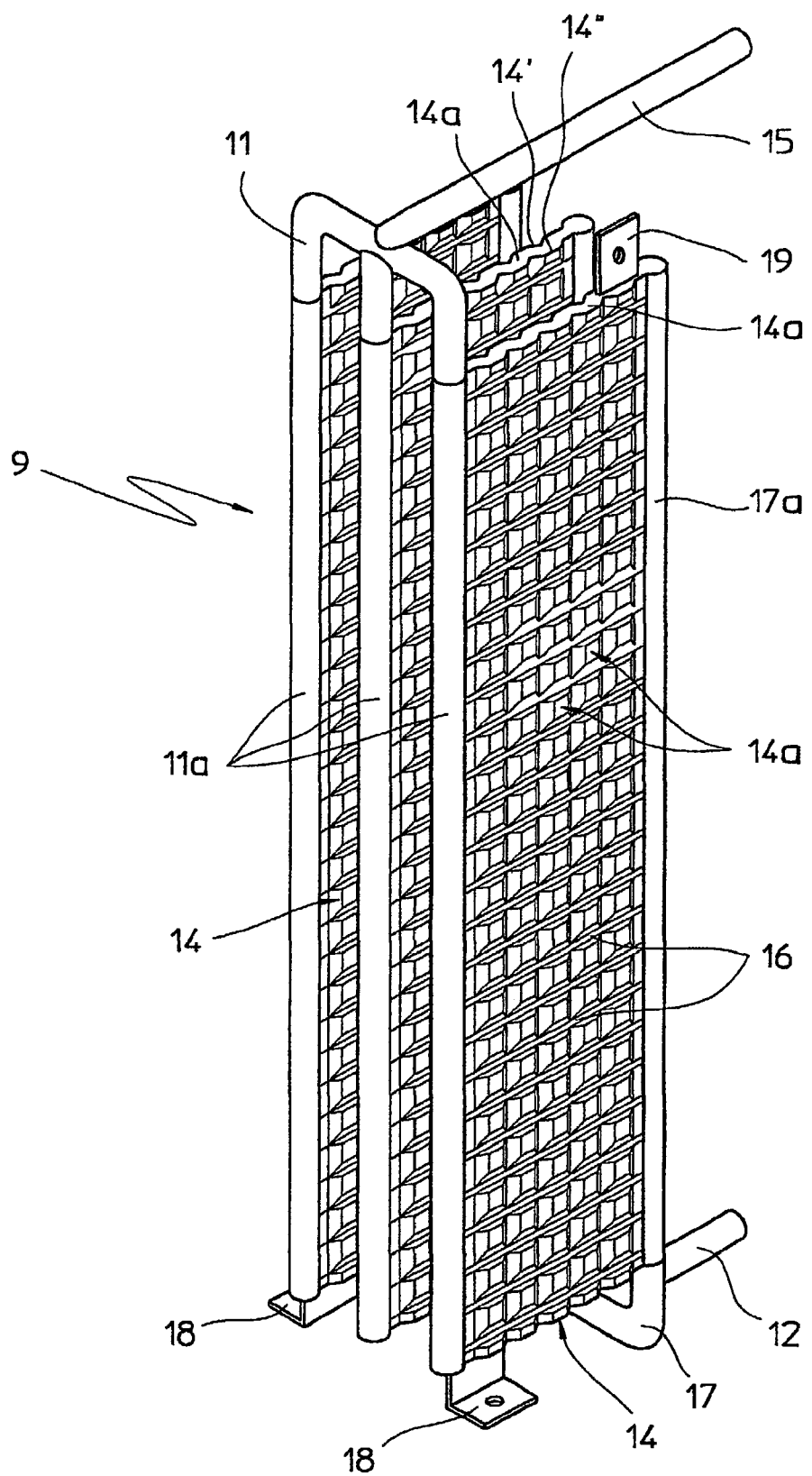
FIG. 5 shows a perspective and enlarged view of a particular of the reactor of FIG. 4.

With reference to FIG. 5, a plate 14 heat exchanger 9 used inside the reactor of FIG. 4, is shown in detail.

The plates 14 comprises walls 14' and 14'' which are mutually juxtaposed and parallel to each other, respectively, and that include a plurality of ducts 14 inside them in which a heat exchange fluid flows perpendicularly to the reactor axis.

The ducts 14a are separated the one from the other sideways by welding lines 16 formed onto plates 14. Only in order to make the figure clearer, the upper end of the plates 14 is shown open so as to let the inside of a respective duct 14a be visible. It is obvious that closing means such as the welding lines 16 are also provided at such upper end of the plates 14.

The ducts 14a end up at the side ends of the plates 14 in ducts 17a and 11a, respectively. The duct 17a is in turn in fluid communication with the duct 12 arranged at the basis of the exchanger 9 through the connecting duct 17. On the contrary, the duct 11a is in fluid communication through the collector 11 with the duct 15 arranged at the top of the heat exchanger 9.

At one or both ends of the plate heat exchanger 9, means is provided such as brackets 18 and 19 which provide for the anchoring of the exchangers as previously described with reference to FIG. 2.

Figure 6:
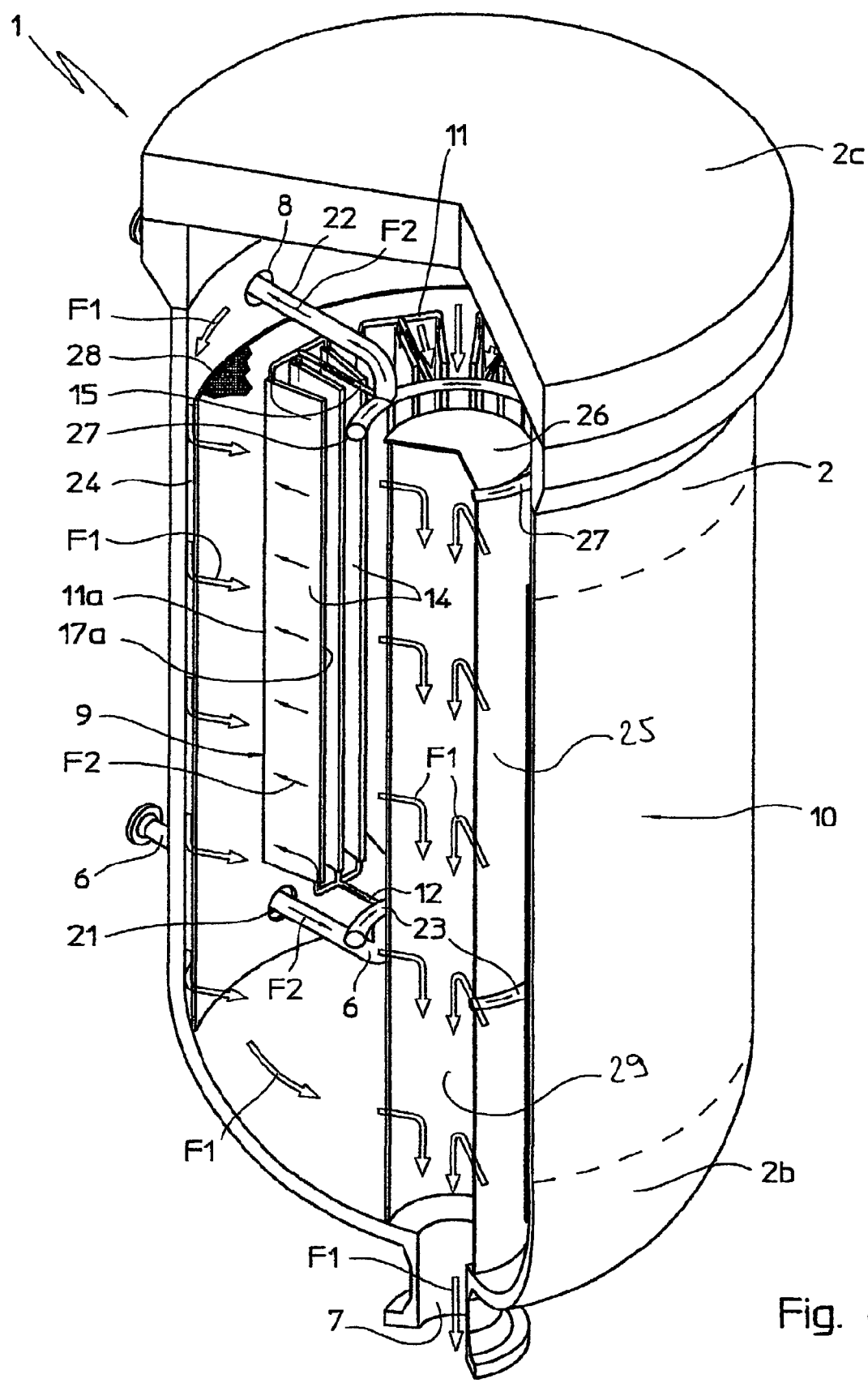
FIG. 6 shows a partial perspective view of an alternative embodiment of the reactor of FIG. 4.

With reference to FIG. 6 an alternative embodiment of the reactor 1 of FIG. 4 is shown, which is characterised in its upper portion by a flanged full aperture of the shell 2 closed by a flat cover 2c. In this case, the aperture—not shown—for the inlet of the reactant gases is obtained in the upper portion of the shell 2.

With reference to FIG. 1, the gaseous reactants for the reaction are fed through the aperture 4 inside the shell 2 and reach the catalytic layer 10 in which the catalyst is provided, cross such layer, while reacting, and are collected in the lower end 2b of the shell 2 exiting then from aperture 7.

During the crossing of the catalytic layer 10, the gaseous reactants react in contact with the catalyst and, if the reaction is of the exothermic type, heat is produced.

Such heat is dissipated by means of indirect heat exchange, that is to say through the contact of the mixture of reacted and unreacted gases with the plates 14 of the exchangers 9 embedded in the catalytic layer 10.

In fact, inside such plates 14 a cooling fluid flows which according to the specific case may be a flow of cold reactants, a diathermic fluid, a fused salt or water. Such flow, with reference to FIG. 2, is fed at a lower temperature than that of the mixture of reacted and unreacted gases, through the duct 12 from which is passes into the duct 17 and flows into the ducts 14a defined inside the plates 14.

After having crossed the plates 14, once that the indirect heat exchange has taken place, such quite overheated fluid is collected by the collector 11 and exits from the exchanger 9 through the duct 15.

Specifically, in the example of FIG. 1, the cooling fluid comprises a flow of reactant gases that, suitably heated inside the exchanger 9, exit therefrom through the aperture 13 of the duct 15 arranged in the area overlaying the catalytic layer 10, and are then mixed with the gaseous reactants fed inside the reactor 1 through the aperture 4.

In other words, the open end 13 is provided specifically for the case in which the gaseous reactants themselves are used as cooling fluids; such gases are then fed through the aperture 4 and partially also through the duct 6.

In the example of FIG. 3, the gaseous reactants cross sequentially a number of catalytic layers 10. Advantageously, the reaction temperature in each catalytic layer 10 may be controlled—layer by layer independently—by respective exchangers 9. In doing so it is possible to adjust the temperature inside the catalytic layer 10 in order to optimise the overall conversion yield.

With reference to FIGS. 4 and 6, the path of the gaseous reactants and of the heat exchange fluid inside the reactor 1 is schematically indicated by the arrows F1 and F2, respectively.

The gaseous reactants are fed through the aperture 4 of the shell 2 and flow in the annular air gap 24 defined between the inner side surface of the shell 2 and the gas-permeable wall 28. Through such wall 28, the gaseous reactants reach the catalytic 10 layer in which the catalyst is arranged. To this respect, the catalytic layer 10 is closed in its upper portion by an annular cover of conventional type, which is not shown.

The gaseous reactants cross the catalytic layer 10, reacting, in a substantially perpendicular direction with respect to the reactor axis (radial flow). They flow out of the catalytic layer 10 through the perforated wall 25 and are collected inside the collector 29 provided centrally in the shell 2 and bounded in its upper side by a cover 26, exiting then from the reactor 1 through the aperture 7.

Alternatively, the catalytic layer 10 is open in its upper side or has a gas-permeable annular grid (not shown) such that the reactant gases pass through it with an axial-radial motion.

During the crossing of such catalytic layer 10, the contact of the reactant gases with the catalyst let the reaction take place and, if this is exothermic, heat is produced.

Such heat is dissipated by means of indirect heat exchange, that is to say through the contact of the mixture of reacted and unreacted gases with the plates 14 of the exchangers 9 embedded in the catalytic layer 10.

In fact, inside such plates 14 a cooling fluid flows of the above mentioned type, which, always with reference to FIGS. 4 and 5, is fed at a lower temperature than that of the mixture of reacted and unreacted gases, through the duct 6 from which is passes into the duct 23, then into duct 12 whereupon, after having being distributed by the ducts 17a, it flows into the ducts 14a of the plates 14.

After having crossed the plates 14, once that the indirect heat exchange has taken place, such quite overheated fluid is collected by the ducts 11a, passes through the collector 11, the ducts 15 and 27 and exits from the shell 2 through the duct 22.

According to the present invention, plate exchangers 9 are advantageously employed as they allow an effective heat exchange to take place thanks to the extended surface provided by the plates 14 impinged by the gaseous reactants, that cross the catalyst layer.

In fact, in case for example of an exothermic reaction, it is desirable to dissipate the heat in excess developed during the crossing of the catalytic layer 10 by the gaseous reactants.

In doing so, the temperature of the catalytic layer 10 may be maintained within a certain range in order to obtain a high reaction yield and also in order to prevent the catalyst from undergoing an excessive thermal stress for the high temperatures reached.

Further on, such exchangers are easy to manufacture, to install and above all to maintain, by virtue of the simple structure that characterises them.

According to an embodiment, such exchangers 9 are also characterised by a cross section of such a dimension as to allow their insertion through the manhole 3 or the aperture 4.

This feature is particularly advantageous in order to carry out the operations of maintenance of the exchangers 9 in case of reactors such as those shown in FIGS. 1, 3 and 4, that is to say comprising access apertures of small diameter than the diameter of the shell 2.

Further on, in the conditions that are described hereinbelow, cases occur for which such characteristic section of the exchangers 9 may be particularly useful in order to obtain further important advantages.

A first advantage thus achieved is that of obtaining, in specific conditions that will be discussed in detail later on, a perfectly operating reactor by revamping an already existing unused reactor.

It shall be considered that, for the requirements that it has to fulfil, the shell of a generic reactor is manufactured with techniques and materials which guarantee a sufficient resistance to pressures, temperature and internal chemical attacks during the process steps.

In fact, in order to carry out some processes, it is necessary to use high operation pressures, high temperatures and to react extremely corrosive or harmful substances.

As a result, the technological difficulties for manufacturing a shell are relevant and its cost is high.

It follows that, for the aforesaid characteristics of resistance, a shell is a structure that can be used for extended periods of time even if the much more structurally delicate inner equipment comprising the exchangers and the catalytic layer is no more used.

Cases exist in which a shell such as that indicated in FIG. 1 is available, but since has inside it an obsolete equipment, the overall structure, including the reactor, may not be used anymore, although the outer shell could eventually be still used for a long period of time.

In such instances, it is then advantageous to equip the inner obsolete equipment with the aforesaid heat exchangers 9 introduced through the aperture 3 or the aperture 4.

Beside the advantage achieved by recovering an obsolete reactor, a second advantage consists in obtaining anyway a retrofitted high efficiency isothermal reactor, both in case of the original one being adiabatic or isothermal.

Such further advantage, whose importance is not secondary to the previous one, guarantees both exothermic and endothermic catalytic reactions to be carried out optimally, whereas such reaction are, as known, more effectively carried out in reactors of the isothermal type rather than of the adiabatic type.

Therefore such revamping guarantees not only the recovery of an unused reactor, but also the conversion of the same, in case it was of the adiabatic type, in an isothermal reactor particularly suitable for the above-specified reactions.

The aforesaid recovery is a complete renovation of the reactor inside, which renovation does not require any modification of shell 2, not desirable particularly in reactors operating at high pressure.

It is useful to repeat that such exchangers may be used for the construction ex-novo of a reactor for exothermic or endothermic catalytic reactions as it has already been widely stated, but also for the retrofit of an existing reactor with the aforesaid features, in particular of the type having an upper bottom with access apertures of smaller diameter than that of the shell.

In this last case, the exchangers 9 of the above mentioned type, are advantageously introduced in the existing reactor through the manhole (aperture 3) or, according to the specific instance., the inlet aperture for the reactant gases (aperture 4). Moreover, the existing side apertures in the shell 2 (such as the aperture 8) are exploited for introducing into the reactor feed ducts or optionally for the removal of the heat exchange fluid.

All the above listed advantages relating to a new reactor are achieved also by an already existing structure revamped as per above with relevant savings.

What is claimed is:

1. Reactor for carrying our exothermic or endothermic heterogeneous reactions comprising:
    an outer shell of substantially cylindrical shape closed at its ends by respective bottoms provided with at least one aperture of diameter smaller than the diameter of the shell;
    at least one heat exchanger embedded in a catalytic layer supported into said shell;
    wherein said heat exchanger is a plate heat exchanger having a cross section of such a dimension as to allow its insertion through said aperture.

2. Reactor according to claim 1, wherein said plates of said exchanger comprise ducts extending parallel to the axis of said shell.

3. Reactor according to claim 2, wherein said plates of said exchanger comprise respective mutually juxtaposed walls which defined between them said ducts extending parallel to the axis of said shell.

4. Reactor according to claim 2, wherein said shell supports a plurality of said heat exchangers in fluid communication with a feed duct of a heat exchange fluid.

5. Reactor according to claim 2, further comprising anchoring means of at least one of said exchangers.

6. Reactor according to claim 1, wherein said plates of said exchanger comprise ducts extending perpendicularly to the axis of said shell.

7. Reactor according to claim 6, wherein said plates of said exchanger comprise respective mutually juxtaposed walls which define between them said ducts extending perpendicularly to the axis of said shell.

8. Reactor according to claim 6, wherein said shell supports a plurality of said heat exchangers in fluid communication with a feed duct of a heat exchange fluid.

9. Reactor according to claim 6, wherein said heat exchangers are arranged radially in said catalytic layer.

10. Reactor according to claim 6, wherein it comprises anchoring means of at least one of said exchangers.

* * * * *